United States Patent
McCaffrey et al.

(10) Patent No.: US 10,458,249 B2
(45) Date of Patent: Oct. 29, 2019

(54) BONDED MULTI-PIECE GAS TURBINE ENGINE COMPONENT

(71) Applicant: United Technologies Corporation, Farmington, CT (US)

(72) Inventors: Michael G. McCaffrey, Windsor, CT (US); Ioannis Alvanos, West Springfield, MA (US); Michael G. Abbott, Jupiter, FL (US); Grant O. Cook, III, Spring, TX (US)

(73) Assignee: United Technologies Corporation, Farmington, CT (US)

( * ) Notice: Subject to any disclaimer, the term of this patent is extended or adjusted under 35 U.S.C. 154(b) by 590 days.

(21) Appl. No.: 15/033,933

(22) PCT Filed: Nov. 5, 2014

(86) PCT No.: PCT/US2014/063977
§ 371 (c)(1),
(2) Date: May 3, 2016

(87) PCT Pub. No.: WO2015/069673
PCT Pub. Date: May 14, 2015

(65) Prior Publication Data
US 2016/0265363 A1 Sep. 15, 2016

Related U.S. Application Data

(60) Provisional application No. 61/901,638, filed on Nov. 8, 2013.

(51) Int. Cl.
*F01D 5/14* (2006.01)
*F01D 5/28* (2006.01)
(Continued)

(52) U.S. Cl.
CPC .............. *F01D 5/147* (2013.01); *F01D 5/14* (2013.01); *F01D 5/18* (2013.01); *F01D 5/284* (2013.01);
(Continued)

(58) Field of Classification Search
CPC . F01D 5/147; F01D 5/18; F01D 5/326; F01D 5/14; F01D 5/284; F02C 7/12;
(Continued)

(56) References Cited

U.S. PATENT DOCUMENTS

| 3,628,226 A | 12/1971 | Nelson |
| 4,142,836 A | 3/1979 | Glenn |

(Continued)

FOREIGN PATENT DOCUMENTS

| JP | 63012802 A | 1/1988 |
| WO | 9933605 | 7/1999 |

OTHER PUBLICATIONS

Supplementary European Search Report for European Patent Application No. 14859735 completed Jul. 24, 2017.
(Continued)

*Primary Examiner* — Justin D Seabe
*Assistant Examiner* — Adam W Brown
(74) *Attorney, Agent, or Firm* — Carlson, Gaskey & Olds, P.C.

(57) ABSTRACT

An airfoil component includes a first segment that has a first piece of a mount and a first piece of an airfoil. The first segment is formed of a first ceramic-based material. A second segment includes a second piece of the mount and a second piece of the airfoil. The second segment is formed of a second ceramic-based material. The first and second segments are bonded together along a bond joint such that
(Continued)

the first and second pieces of the mount are bonded to each other and the first and second pieces of the airfoil are bonded to each other.

3 Claims, 4 Drawing Sheets

(51) Int. Cl.
    *F01D 5/18*                (2006.01)
    *F01D 5/32*                (2006.01)
    *F02C 3/04*                (2006.01)
    *F02C 7/12*                (2006.01)

(52) U.S. Cl.
    CPC ............... *F01D 5/326* (2013.01); *F02C 3/04* (2013.01); *F02C 7/12* (2013.01); *F05D 2220/32* (2013.01); *F05D 2240/12* (2013.01); *F05D 2300/6033* (2013.01); *Y02T 50/672* (2013.01)

(58) Field of Classification Search
    CPC .... F02C 3/04; F05D 2240/12; F05D 2220/32; Y02T 50/672
    See application file for complete search history.

(56) References Cited

U.S. PATENT DOCUMENTS

| | | | |
|---|---|---|---|
| 4,375,233 A | | 3/1983 | Rossmann et al. |
| 5,234,152 A | | 8/1993 | Glaeser |
| 5,246,340 A | * | 9/1993 | Winstanley ............ B23P 15/04 415/115 |
| 5,372,298 A | | 12/1994 | Glaeser |
| 5,836,075 A | | 11/1998 | Fitzgerald et al. |
| 6,155,783 A | * | 12/2000 | Beyer ..................... F03B 3/02 29/469.5 |
| 6,193,141 B1 | | 2/2001 | Burke et al. |
| 6,508,000 B2 | | 1/2003 | Burke et al. |
| 7,189,064 B2 | | 3/2007 | Helder et al. |
| 7,291,407 B2 | * | 11/2007 | Merrill .................... C04B 35/10 428/701 |
| 7,565,996 B2 | | 7/2009 | Das |
| 8,231,354 B2 | | 7/2012 | Campbell et al. |
| 8,235,670 B2 | * | 8/2012 | Morrison ................ F01D 5/147 29/889.72 |
| 8,986,490 B2 | * | 3/2015 | Strother ............... B21D 26/021 156/285 |
| 9,186,866 B2 | * | 11/2015 | Merrill .................... B22F 7/002 |
| 9,586,868 B2 | * | 3/2017 | Cook, III ............... B23K 20/00 |
| 9,598,967 B2 | * | 3/2017 | Xu ............................ F01D 5/30 |
| 10,024,333 B2 | * | 7/2018 | Roach ................... F04D 29/322 |
| 2006/0228211 A1 | | 10/2006 | Vance et al. |
| 2008/0203236 A1 | | 8/2008 | Mazzola et al. |
| 2010/0189556 A1 | * | 7/2010 | Propheter-Hinckley ..................... F01D 5/284 415/200 |
| 2012/0301312 A1 | | 11/2012 | Berczik et al. |
| 2013/0167555 A1 | | 7/2013 | Schwarz et al. |

OTHER PUBLICATIONS

International Search Report and the International Written Opinion for PCT Application No. PCT/US2014/063977 dated Feb. 11, 2015.
MacDonald, W.D. and Eagar, T.W. (1992). Transient liquid phase bonding. Ann. Rev. Mater. Sci. 1992. 22:23-46.
Cook, III, G.O. and Sorensen, C.D. (2011). Overview of transient liquid phase and partial transient liquid phase bonding. Journal of Material Science (2011) 46:5305-5323.
The International Preliminary Report on Patentability for PCT Application No. PCT/US2014/063977, dated May 19, 2016.

* cited by examiner

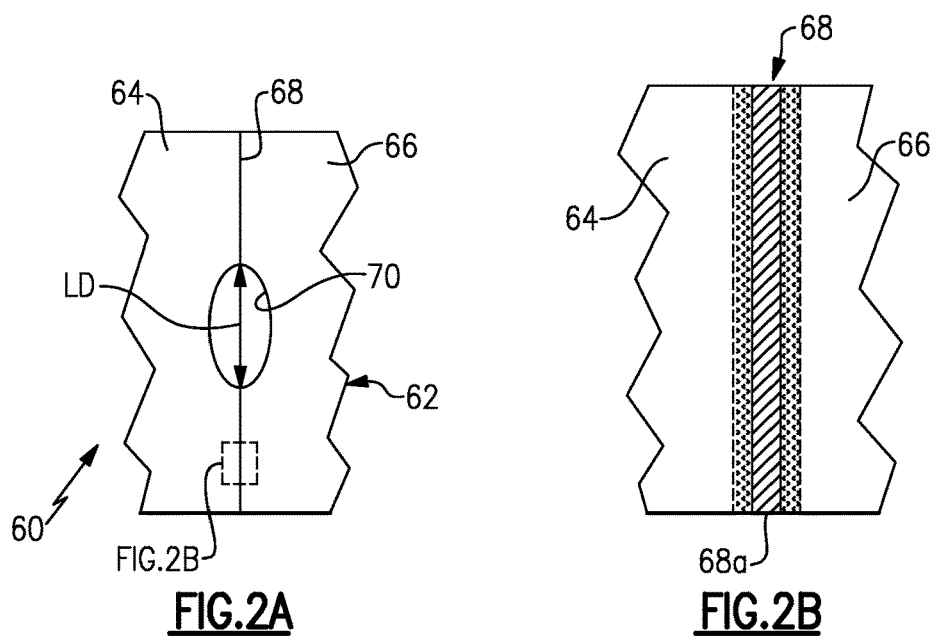
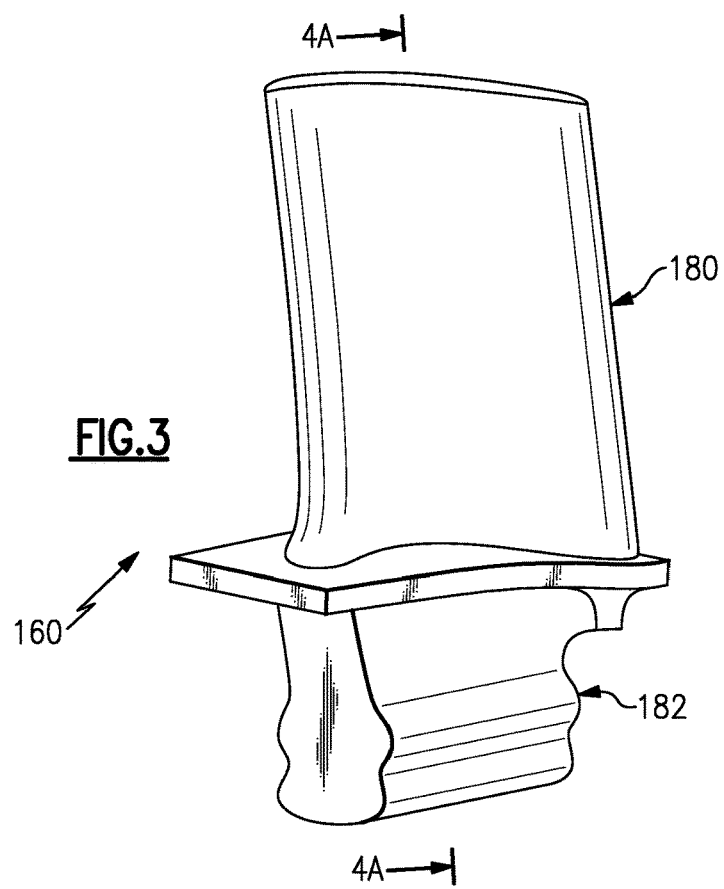

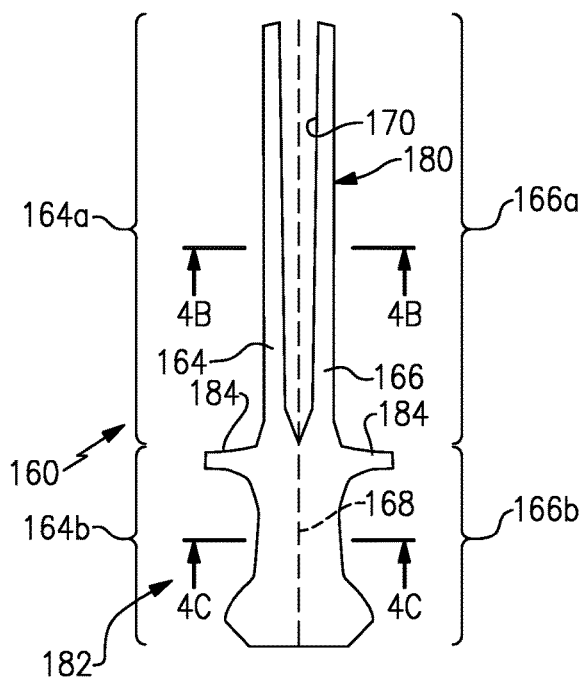
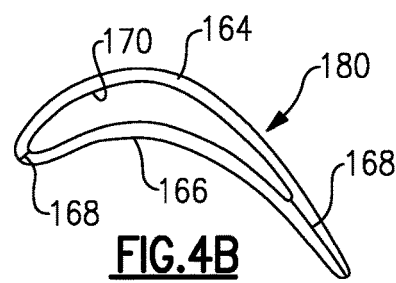
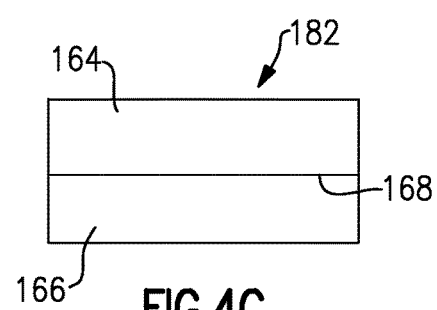
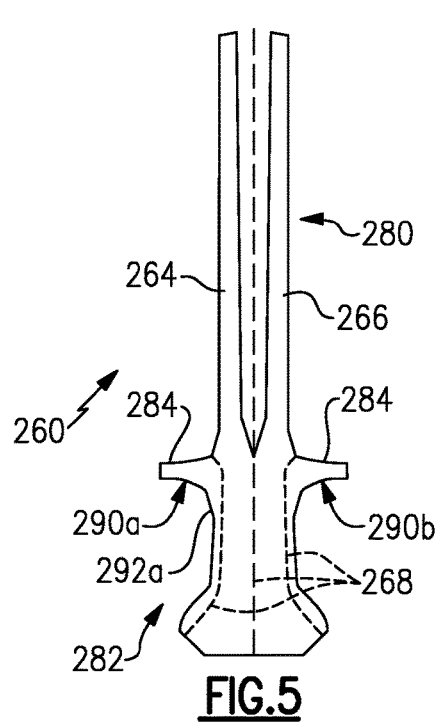
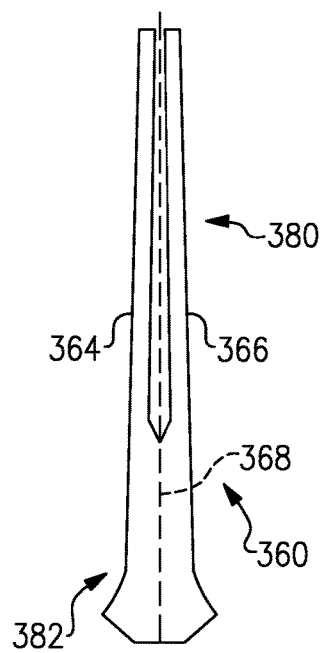
FIG.4A
FIG.4B
FIG.4C
FIG.5
FIG.6

BONDED MULTI-PIECE GAS TURBINE ENGINE COMPONENT

CROSS-REFERENCE TO RELATED APPLICATION

This application claims priority to U.S. Provisional Application No. 61/901,638, filed Nov. 8, 2013.

BACKGROUND

A turbomachine, such as a gas turbine engine, typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and, optionally, a fan section if the turbomachine is used as a propulsor.

The turbine section, compressor section, and fan section include airfoils. As can be appreciated, the airfoils of each section differ in design. An airfoil can be fabricated of a metal alloy, the composition of which can depend on the design operating conditions of the airfoils. Some airfoils are cast from the selected metal alloy. Depending on the operating conditions, the airfoil may include a coating on the outside to protect from thermal, environmental or other conditions.

SUMMARY

An airfoil component according to an example of the present disclosure includes a first segment including a first piece of a mount and a first piece of an airfoil. The first segment is formed of a first ceramic-based material. A second segment includes a second piece of the mount and a second piece of the airfoil. The second segment is formed of a second ceramic-based material. The first and second segments are bonded together along a bond joint such that the first and second pieces of the mount are bonded to each other and the first and second pieces of the airfoil are bonded to each other.

In a further embodiment of any of the foregoing embodiments, the bond joint includes a refractory interlayer between the first segment and the second segment.

In a further embodiment of any of the foregoing embodiments, the first and second segments define at least one cavity there between.

In a further embodiment of any of the foregoing embodiments, the at least one cavity has a maximum lateral dimension of 0.51 millimeters or less.

In a further embodiment of any of the foregoing embodiments, the at least one cavity has a maximum lateral dimension of 0.26 millimeters or less.

In a further embodiment of any of the foregoing embodiments, at least one of the first ceramic-based material and the second ceramic-based material is a fiber-reinforced ceramic matrix composite.

In a further embodiment of any of the foregoing embodiments, at least one of the first ceramic-based material and the second ceramic-based material is a laminate fiber-reinforced ceramic matrix composite.

In a further embodiment of any of the foregoing embodiments, at least one of the first ceramic-based material and the second ceramic-based material includes at least one of a carbide and a nitride.

In a further embodiment of any of the foregoing embodiments, the airfoil includes a hollow cavity and the mount is solid.

In a further embodiment of any of the foregoing embodiments, the first segment and the second segment include a radially inner end at the mount and a radially outer end at the airfoil that define a radial direction, the bond joint extending in the radial direction.

In a further embodiment of any of the foregoing embodiments, a third segment includes at least one of a third piece of the mount and a third piece of the airfoil, the third segment being bonded with at least one of the first segment and the second segment along another bond joint.

In a further embodiment of any of the foregoing embodiments, the third segment includes a third piece of the mount and at least a piece of an endwall of the airfoil.

In a further embodiment of any of the foregoing embodiments, the third segment includes at least a piece of a trailing edge of the airfoil.

A gas turbine engine according to an example of the present disclosure includes an optional fan, a compressor section, a combustor in fluid communication with the compressor section, a turbine section in fluid communication with the combustor, and an airfoil in at least one of the optional fan, the compressor section, and the turbine section. The airfoil has a first segment including a first piece of a mount and a first piece of an airfoil. The first segment is formed of a first ceramic-based material. A second segment includes a second piece of the mount and a second piece of the airfoil. The second segment is formed of a second ceramic-based material. The first and second segments are bonded together along a bond joint such that the first and second pieces of the mount are bonded to each other and the first and second pieces of the airfoil are bonded to each other.

In a further embodiment of any of the foregoing embodiments, the bond joint includes a refractory interlayer between the first segment and the second segment.

In a further embodiment of any of the foregoing embodiments, the first and second segments define at least one cavity there between.

In a further embodiment of any of the foregoing embodiments, at least one of the first ceramic-based material and the second ceramic-based material is a fiber-reinforced ceramic matrix composite.

A gas turbine engine component according to an example of the present disclosure includes a component body configured for use in a gas turbine engine. The component body includes a first segment formed of a first ceramic-based material and a second segment formed of a second ceramic-based material. The first and second segments are bonded together along a bond joint.

In a further embodiment of any of the foregoing embodiments, the bond joint includes a refractory interlayer between the first segment and the second segment.

In a further embodiment of any of the foregoing embodiments, the first and second segments define at least one cavity there between.

In a further embodiment of any of the foregoing embodiments, at least one of the first ceramic-based material and the second ceramic-based material is a fiber-reinforced ceramic matrix composite.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2A illustrates an example gas turbine engine component of the engine of FIG. 1.

FIG. 2B illustrates a representative portion of the component of FIG. 2A.

FIG. 3 illustrates another example gas turbine engine component.

FIG. 4A illustrates a sectioned view of the component of FIG. 3.

FIG. 4B illustrates a sectioned view of the component shown in FIG. 4A.

FIG. 4C illustrates another sectioned view of the component in FIG. 4A.

FIG. 5 illustrates a sectioned view of another example gas turbine engine component.

FIG. 6 illustrates a sectioned view of another example gas turbine engine component.

7B illustrates a sectioned view of another example gas turbine engine component.

7C illustrates a sectioned view of another example gas turbine engine component.

Figure 8:
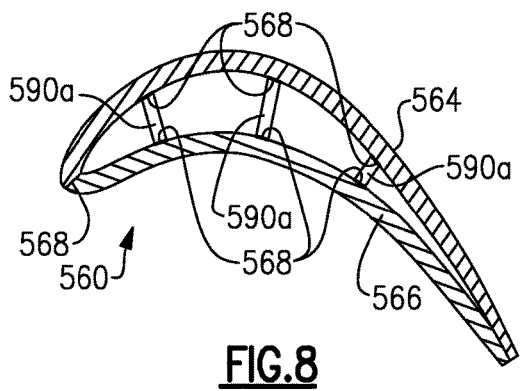

FIG. 8 illustrates a sectioned view of another example gas turbine engine component.

DETAILED DESCRIPTION

Figure 1:
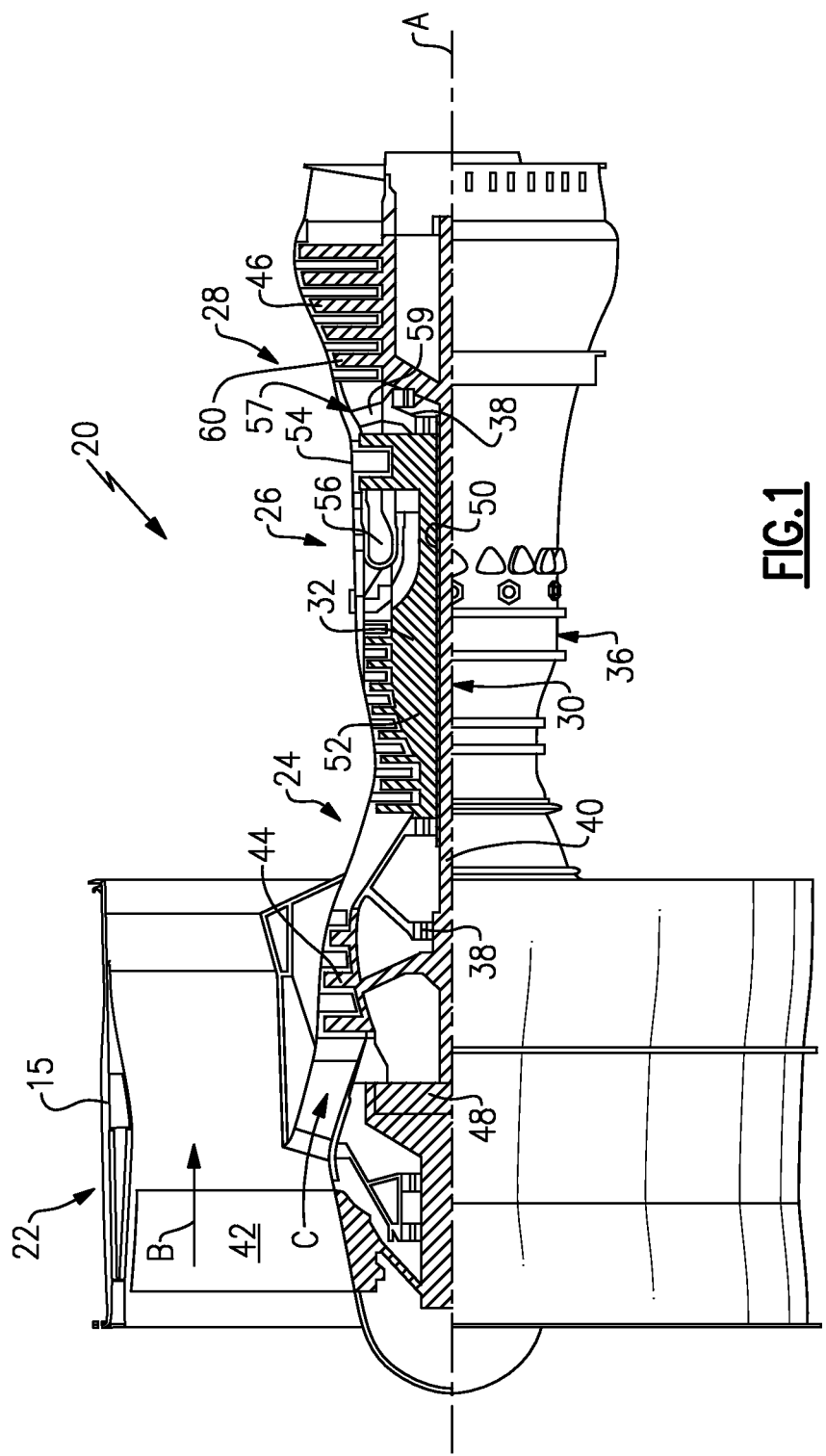
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low-pressure) compressor 44 and a first (or low-pressure) turbine 46. The inner shaft 40 is connected to the fan 42 through a speed-change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high-pressure) compressor 52 and a second (or high-pressure) turbine 54. A combustor 56 is arranged in exemplary gas turbine 20 between the high-pressure compressor 52 and the high-pressure turbine 54. A mid-turbine frame 57 of the engine static structure 36 is arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 57 includes airfoils 59 which are in the core airflow path C. The turbines 46, 54 rotationally drive the respective low-speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low-pressure turbine 46 has a pressure ratio that is greater than about five. In one disclosed embodiment, the engine 20 bypass ratio is greater than about ten (10:1), the fan diameter is significantly larger than that of the low-pressure compressor 44, and the low-pressure turbine 46 has a pressure ratio that is greater than about five 5:1. Low-pressure turbine 46 pressure ratio is pressure measured prior to inlet of low-pressure turbine 46 as related to the pressure at the outlet of the low-pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry-standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry-standard temperature correction of $[(Tram\ °R)/(518.7°R)]^{0.5}$. The "Low corrected fan tip speed" as disclosed herein according to one non-limiting embodiment is less than about 1150 ft/second.

The engine 20 includes an engine component 60, which in this example is represented as a turbine blade in the turbine section 28 of the engine 20. FIG. 2A illustrates a representative portion of the component 60. It is to be understood that although the component 60 can be a turbine blade, that the component 60 alternatively can be another type of component in the engine 20, such as but not limited to, airfoils (blades and vanes), blade outer air seals, combustor liners, or other components that would benefit from the disclosure herein.

In this example, the component 60 includes a component body 62, which can be formed in a geometry that is adapted for use in the engine 20. The body 62 includes a first segment 64 that is formed of a first ceramic-based material and a second segment 66 that is formed of a second ceramic-based material. The first and second segments 64/66 are bonded together along a bond joint 68. The first and second segments 64/66 in this example include at least one cavity 70 there between.

The first ceramic-based material and the second ceramic-based material of the segments 64/66 can be selected in accordance with the desired properties of the component 60 in the engine 20. Additionally, the compositions of the first ceramic-based material and the second ceramic-based material can be the same or different, again depending upon the desired properties of the end-use component 60. In some examples, one or both of the segments 64/66 are formed of a fiber-reinforced ceramic matrix composite. An example fiber-reinforced ceramic matrix composite is a laminate that includes distinct layers or plies of fibers that are embedded in a ceramic matrix material. The plies or layers are laminated together to form the fiber-reinforced ceramic matrix composite. Alternatively, one or both of the segments 64/66 could be a monolithic ceramic material.

FIG. 2B illustrates an enlarged portion of a section of the component 60 in FIG. 2A along the bond joint 68. In this example, the bond joint 68 includes a refractory interlayer 68a between the segments 64/66. The refractory interlayer 68a is a vestige of the processing technique used to bond segments 64/66 together. For example, a process of partial transient liquid phase (PTLP) bonding utilizes an interlayer and results in the presence of the interlayer 68a in the bond joint 68 of the final component. The PTLP process will be described in more detail below.

FIG. 3 illustrates another example component 160. In this example, the component 160 is an airfoil. Although shown as a blade, the examples are also applicable to vanes. For example, the turbine section 28 and the compressor section 24 each utilize rotatable blades and static vanes. The fan section 22 also utilizes rotatable blades. As can be appreciated, the particular design of the airfoil may be varied according to its location and function in the engine 20. In this disclosure, like reference numerals designate like elements where appropriate and reference numerals with the addition of one-hundred or multiples thereof designate modified elements that are understood to incorporate features and benefits of the corresponding elements.

In this example, the component 160 includes an airfoil 180 and a mount 182 that is configured to support the airfoil 180 from another structure in the engine 20. Blades are typically mounted in a rotor using a dovetail-type of mount. Vanes can be mounted using mechanical hooks or interlocks that engage a case or other structures in the engine 20. As can be appreciated, the particular type or geometry of the mount 182 can vary depending upon the design of the component 160.

FIG. 4A represents a radially sectioned view of the component 160. FIG. 4B and FIG. 4C represent additional sectioned views according to the section lines shown in FIG. 4A. As shown, the component 160 includes a first segment 164 and a second segment 166. The first segment 164 is formed of a first ceramic-based material and the second segment 166 is formed of a second ceramic-based material, as described above. The first segment includes a first piece 164a of the airfoil 180 and the second segment 166 includes as second piece 166A of the airfoil 180. The first segment 164 also includes a first piece 164b of the mount 182 and the second segment also includes a second piece 166b of the mount 182. The segments 164 and 166 are bonded together along a bond joint 168 such that the first and second pieces 164b/166b of the mount 182 are bonded to each other and the first and second pieces 164a/166a of the airfoil 180 are bonded to each other.

In this example, the airfoil 180 includes a hollow cavity 170 and the mount 182 is solid. The walls of the airfoil pieces 164a/166a can also include one or more cooling holes for communication with the exterior of the component 60. In some examples, there can also be one or more channels through the mount 182 to, for example, convey cooling fluid into the cavity 170. However, the ceramic-based materials are thermally resistant and cooling may not be needed in some implementations.

In this example, the segments 164/166 fully or substantially fully form the end-use component 160. In this regard, the first and second pieces 164b/166b of the mount 182 include an end wall 184 of the airfoil 180.

FIG. 5 shows a modified example of another component 260. In this example, the component 260 is similar to the component 160 of FIG. 4A, but rather than the end wall 184 being included on the first and second segments 164/166, the end wall is provided on additional segments. The first and second segments 264/266 of the component 260 do not include end walls. A third segment 290a includes a third piece 292a of the mount 282. The third segment 290a is bonded with the first segment 264 in this example. A similar segment 290b can also be bonded with the second segment 266. Together, the segments 290a/290b include at least a piece of an end wall 284 of the airfoil 280. The segments 290a/290b can also be formed of a ceramic-based material, as described above.

In another example shown in FIG. 6, the component 360 is somewhat similar to the component 260 of FIG. 5, but does not include the segments 290a/290b. Thus, in the example, the component 360 includes an airfoil 380 and a mount 382 but no end wall.

Figure 7A:
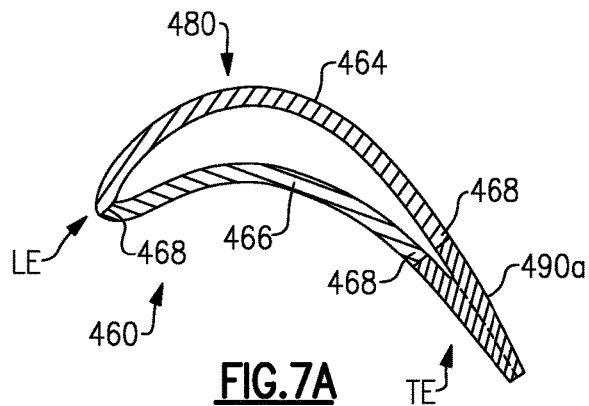
FIG. 7A illustrates a sectioned view of another example gas turbine engine component.

In another example shown in FIG. 7A, a component 460 includes first and second segments 464/466 bonded together at bond joint 468, similar to described above with respect to component 60. However, in this example, an additional, third segment 490a is bonded to at least one of the segments 464/466. In this example, the third segment 490a is bonded to both of the segments 464/466. The segments 464/466 form most of the airfoil 480, including a leading end, LE. The third segment 490a forms the trailing end, TE, of the airfoil 480. As can be appreciated, the third segment 490a may or may not include a piece of a mount.

Figure 7B:
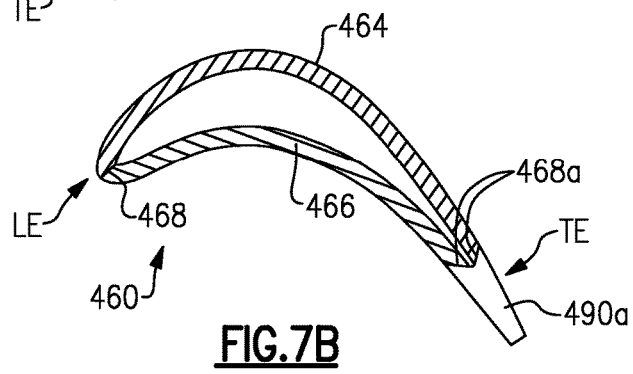

In one variation of the component 460 shown in FIG. 7B, the third segment 490a is bonded to the segments 464/466 at sloped bond joints 468a. In this example, the sloped bond joints 468a are sloped with respect to the peripheral surfaces of the airfoil 460 and form a "V" shape with respect to each other. In this example, the point of the "V" is generally oriented toward the TE of the airfoil 460.

Figure 7C:
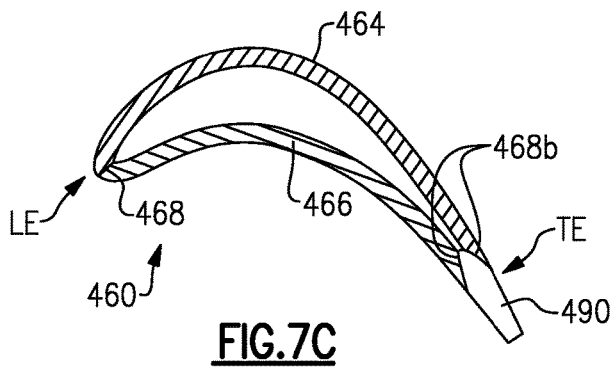

In another variation of the component 460 shown in FIG. 7C, the third segment 490a is also bonded to the segments 464/466 at sloped bond joints 468b, but the sloped bond joints 468b are sloped in the other direction than in FIG. 7B such that the point of the "V" is generally oriented toward the LE of the airfoil 460. As can be appreciated, the airfoil 460 can include one or more of the sloped bond joints 468a/468b, and can transition between the sloped bond joints 468a/468b (or the straight joints 468 of FIG. 7A or similar joints) along the radial direction of the airfoil 460.

In another example shown in FIG. 8, component 560 includes first and second segments 564/566 bonded together at bond joint 568, similar to described above with respect to component 60. However, in this example, one or more additional, third segments, 590a (three shown) is bonded to at least one of the segments 564/566. In this example, the third segment 590a is an internal spar that is bonded to both of the segments 564/566.

Gas turbine engine components can require relatively complex geometries. Such geometries can require casting the component of high-temperature alloys. If hollow, the component must be cast around a sacrificial core, which is later removed. If made of ceramic materials, the ceramic materials must be arranged around a sacrificial core that is later removed. The core can be made of ceramic material or graphite material. The core complicates the fabrication process and introduces complexities in the arrangement of the plies around the core during processing. However, by forming such components from multiple segments as disclosed herein, a relatively simple geometry segment can be easily made from a ceramic-based material and then bonded to a corresponding segment to form the desired component. Thus, processing that involves the use of cores can be avoided or eliminated, while increasing reproducibility of complex shapes. Additionally, fiber plies for a ceramic-based material can be more accurately placed with respect to an individual segment.

In further examples, the cavity 70/170 is or includes at least one very thin passage, such as one or more cooling channels at the trailing edge TE region of an airfoil. As an example, the passage or passages of the cavity 70/170 have a maximum lateral dimension of 0.51 millimeters (20 mils) or less, an example of which is represented at LD in FIG. 2A. In a further example, the passage or passages of the cavity 70/170 have a maximum lateral dimension of 0.26 millimeters (20 mils) or less. A ceramic or graphite core typically used for processing a CMC is too fragile to form such small passages. A ceramic or pgrahpite core must be supported during processing and accessible for removal. A comparably sized core would be too weak and would be damaged during the assembly and thermal processing steps. Thus the advantage of bonding segments together as disclosed herein is that small passage halves can be formed in the respective segments by simple shapes in the primary tool, and then the final shape of the passage created by bonding the segments together. The same could be applied to multi-wall components, where the hollow cavities could be controlled to a very small passage size.

Various bonding techniques are available for bonding the segments herein together. In some examples, the bond joint is a diffusion joint. A diffusion joint is a joint that is formed by, and has physical characteristics of, a bonding process that is conducted at a temperature that is sufficient to cause diffusion and results in the bonding together of two or more components. In a further example, the diffusion is the primary mechanism by which the bond strength is increased beyond that achieved by localized wetting of the substrates such that, in the absence of the diffusion, the bond strength reaches a ceiling or cap that might not be sufficient for certain applications. A diffusion joint can be formed using brazing, diffusion bonding, transient liquid phase bonding or partial transient liquid phase bonding, but is not limited to such techniques.

Additionally, as also briefly discussed above, the examples herein are not limited to airfoils in a turbine section or even airfoil structures. Blade outer air seals can also benefit from the disclosed examples. For example, a blade outer air seal typically includes a plurality of circumferential segments that are arranged about a rotor in an engine. Blade outer air seals are used around the turbine section 28 in the engine 20. A single blade outer air seal piece is an arc-segment and can include a multi-piece design, similar to as described herein, that include multiple segments that are bonded together. Various passages can be formed in one or more of the bonded segments to permit cooling of the blade outer air seal.

The bond joints formed herein can be formed by a process of transient liquid phase (TLP) bonding. TLP bonding is a hybrid of brazing and diffusion bonding processes that avoids the presence of relatively weak or low-melting resultant braze products by utilizing diffusion during the bonding process. In TLP bonding, one or more interlayers are provided in joints between segments that are to be bonded together. The component is then heated at a bonding temperature to melt the interlayer(s), filling any gaps between the segments. Certain alloying elements of the interlayer(s) interdiffuse with the materials of the segments, causing a compositional change in the joint which isothermally solidifies and creates a bond between the two segments. The bonding temperature can be held for an additional period of time to allow more homogenous diffusion. TLP bonding requires little or no pressure to be applied to the segments, compared to diffusion bonding, and thus can mitigate, or avoid, distortion of the segments during the bonding process. The composition of the interlayer(s) can be selected according to the compositions of the materials of the segments that are being bonded together. Thus, the selection of first and second materials for bonded segments can be subject to a mutually compatible interlayer or interlayers. Given this description, one of ordinary skill in the art will be able to select an appropriate interlayer or interlayers for the materials of their particular segments.

The diffusion joints formed herein can also be formed by a process of partial transient liquid phase (PTLP) bonding. PTLP bonding is a variation of TLP bonding that is often used for joining non-metallic materials. In PTLP bonding, a multi-layer interlayer is provided in joints between segments that are to be bonded together. This multi-layer interlayer can be composed of three layers: a thick refractory layer that does not melt during the process and thinner layers on each side of the thick refractory layer. These layers are often pure elements, though alloys can be used. The component is then heated at a bonding temperature to melt the thin layers of the multi-layer interlayer. These thin layers diffuse into the thick refractory layer of the interlayer, causing a compositional change in the joint which isothermally solidifies and creates a bond between the two segments. Simultaneously, these thin liquid layers wet (adhere to) the segments. This wetting is brought about by the thin layers' composition(s) or an alloy of the thin layer(s) with the refractory core layer. The bonding temperature can be held for an additional period of time to allow more homogenization of the resulting PTLP bond, further increasing the bond's remelting temperature. PTLP bonding requires little or no pressure to be applied to the segments, compared to diffusion bonding, and thus greatly mitigates, or avoids, distortion of the segments during the process. The composition of the interlayer(s) can be selected according to the compositions of the materials of the segments that are being bonded together. Thus, the selection of first and second materials for bonded segments can be subject to a mutually compatible interlayer or interlayers. Given this description, one of ordinary skill in the art will be able to select an appropriate interlayer or interlayers for the materials of their particular segments.

Various bonding material formats can be employed for TLP bonding or PTLP bonding. Suitable bonding material formats can include, but are not limited to, an alloy foil, a foil formed from a pure metal, multiple layers of foils, or combinations thereof. Other formats such as, but not limited to, powder, powder compact, braze paste, or one or more metallic layers applied by electroplating, physical vapor deposition, or another suitable metal deposition process, may also be used.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil component comprising:
   a first segment including a first piece of a mount and a first piece of an airfoil, the first segment formed of a first ceramic-based material;
   a second segment including a second piece of the mount and a second piece of the airfoil, the second segment formed of a second ceramic-based material, the first and second segments being bonded together along a bond joint such that the first and second pieces of the mount are bonded to each other and the first and second pieces of the airfoil are bonded to each other; and
   a third segment including at least one of a third piece of the mount and a third piece of the airfoil, the third segment being bonded with at least one of the first segment and the second segment along another bond joint.

2. The airfoil component as recited in claim 1, wherein the third segment includes a third piece of the mount and at least a piece of an endwall of the airfoil.

3. The airfoil component as recited in claim 1, wherein the third segment includes at least a piece of a trailing edge of the airfoil.

\* \* \* \* \*